Patented Oct. 18, 1932

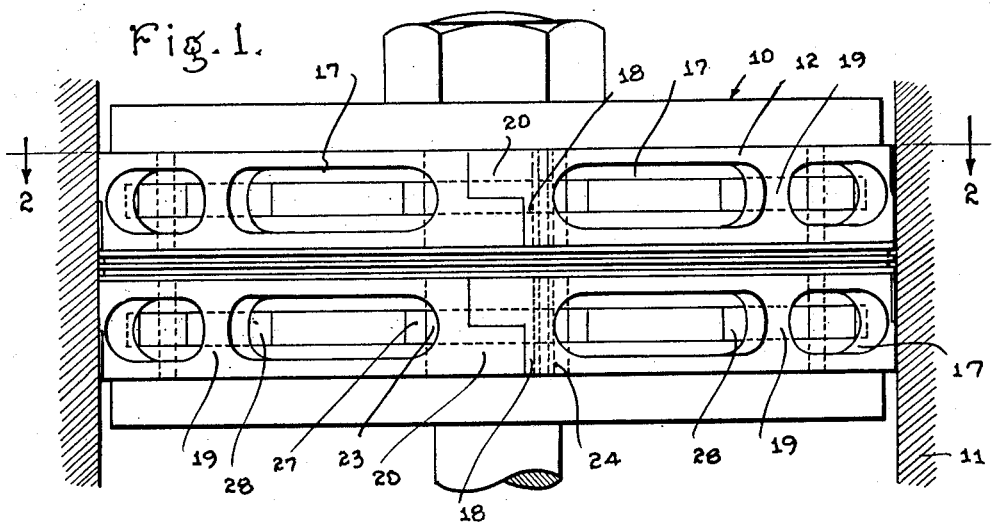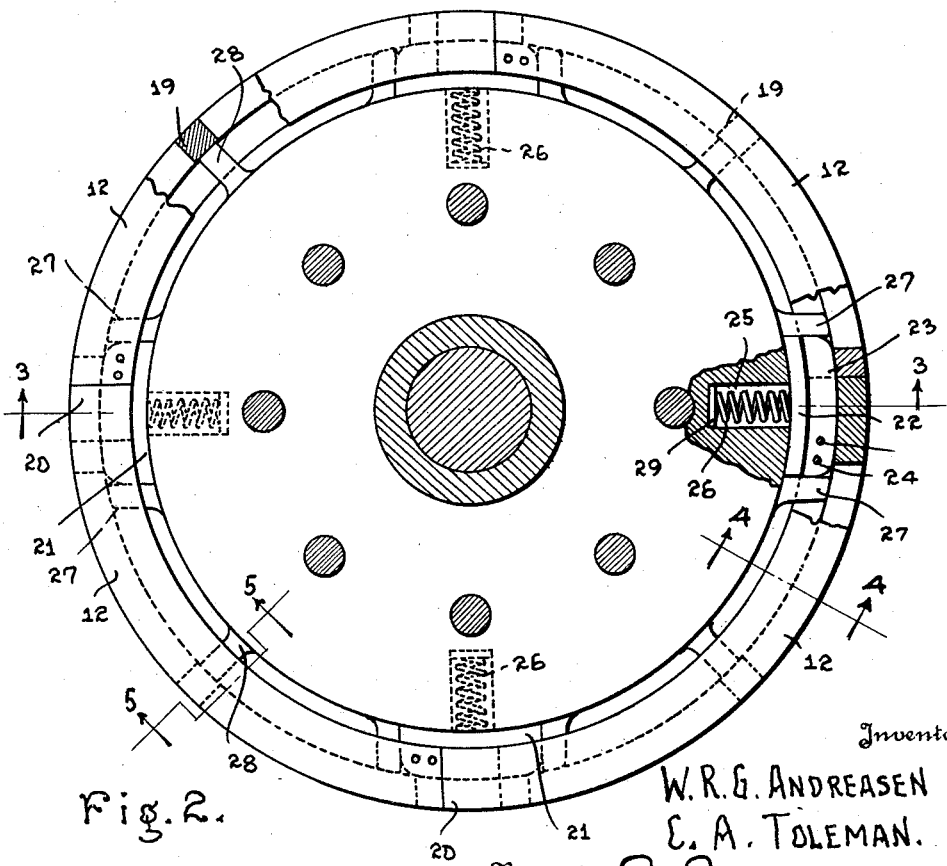

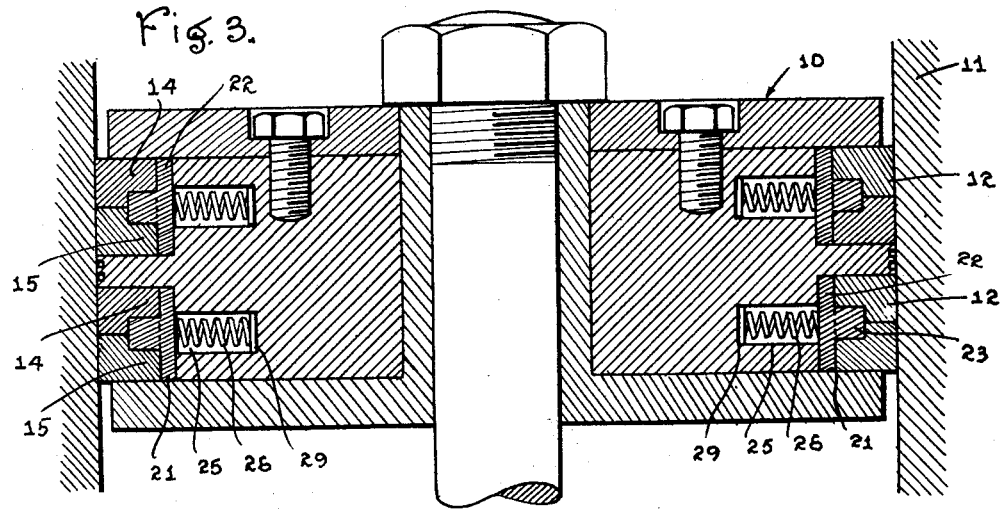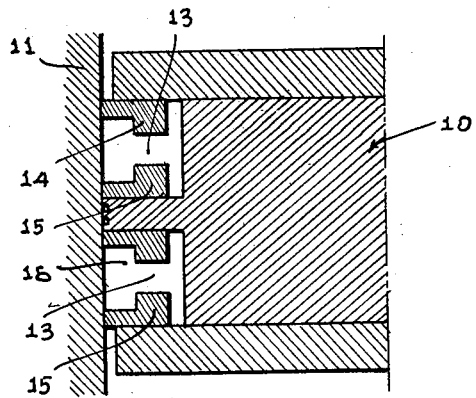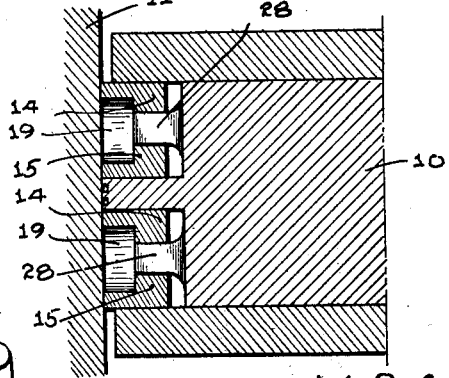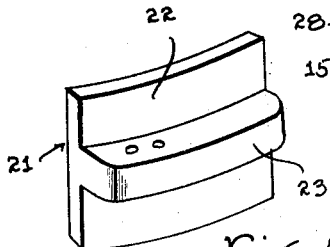

1,883,448

UNITED STATES PATENT OFFICE

WALTER R. G. ANDREASEN AND CLIFFORD A. TOLEMAN, OF EAST BOSTON, MASSACHUSETTS, ASSIGNORS OF ONE-THIRD TO PETER KANE, OF BOSTON, MASSACHUSETTS

PISTON RING

Application filed November 10, 1930. Serial No. 494,684.

The present invention relates to pistons and piston rings, the object being generally to provide a structure of this character which can be easily applied and which will result in an effective and sealing engagement between the piston and the cooperating cylinder.

More particularly the present invention relates to a sectional piston ring and preferably to a piston ring of the type in which springs carried by the piston exert an outward pressure upon the rings so as to cause the rings to press into sealing engagement with the cylinder walls.

One object of the invention is to provide a piston ring which will not permit any substantial pressure being trapped between the piston ring and the piston or bull ring.

In the embodiment of this invention disclosed in the drawings accompanying the present application and described in the following specification, the piston ring consists of four overlapping quadrants, one end of each quadrant carrying a sealing block which overlaps the adjacent quadrant, the piston carrying a helical spring which engages the rear face of the sealing block and transmits this pressure to the adjacent pair of quadrants. By this construction, the entire outer area of each segment or quadrant is constantly maintained in resilient and sealing engagement with the cylinder walls until substantially all the available wearing thickness of the ring is worn off.

Other objects and advantages that flow from the present invention will become apparent to persons skilled in the art from the accompanying drawings and the following specification; it being understood that the form of the invention shown herein is illustrative of my invention and modification thereof, falling within the scope of the appended claims, will be apparent to persons skilled in the art.

In the drawings:

Fig. 1 is a side elevation of a piston carrying piston rings embodying the present invention.

Fig. 2 is a view taken on line 2—2 of Fig. 1.

Fig. 3 is a sectional view taken on line 3—3 of Fig. 2.

Fig. 4 is a sectional view taken on line 4—4 of Fig. 2.

Fig. 5 is a sectional view taken on line 5—5 of Fig. 2.

Fig. 6 is a perspective view of the sealing block.

Referring to the drawings, 10 designates a piston generally of any desired construction and 11 designates the cylinder walls.

The piston ring consists of four arcuate segments or quadrants 12 of suitable material. The inner face of each quadrant or segment 12 is divided into three longitudinal zones, equal to each other in height, and the middle zone is grooved to a depth equal to one-half the thickness of the ring thus forming the channel 13, reaching from end to end of the inner face of the ring, the same being bordered by the portions 14 and 15, above and below, respectively, of the groove 13.

The outer face of the ring and of each segment is also divided into three longitudinal zones, the middle zone being twice the height of the upper and lower zones, the latter zones being equal in height. Parts of the middle zone are cut away to meet the rear channel 13 as shown at 16 and 17, leaving the ends of the segments 18 uncut and also leaving one or more intermediate portions 19 uncut. While, as shown, only one bridge 19 is provided, it will be understood that if desired the number of such bridges may be increased, the number depending upon the size of the ring and upon other operating conditions. The ends 18 of the segments are provided with overlapping shouldered portions 20.

One end of each segment carries a sealing block 21 whose detail construction appears in Figure 6. The block 21 comprises an arcuate base 22 adapted to fit within the bull ring of the piston and having a height substantially equal to the total height of the segment. The laterally projecting longitudinal lug 23 is adapted to fit into the end portion of the channel 13 of the segment and is held fixed by means of pins 24 which pass through the portion 14 and 15 of the segment. The block 21 is so disposed with relation to the segment carrying it that it projects therefrom, so that when a set of these segments are assembled in the bull ring of the piston the sealing blocks are made to overlap adjacent segments and the lug 23 is disposed in part in channel 13 of one segment and in part in channel 13 of the othere segment.

The piston is provided with a series of radial recesses 25 at points disposed behind the sealing blocks 21, these recesses having helical springs 26 which press against the sealing blocks, which in turn transmit this pressure to the overlapping ends of the segments. The recesses 25 are also adapted to receive discs 29 to adjust the pressure of the springs. By means of such discs the wear on the rings may be taken up.

In order to facilitate the proper assembly of the ring on the piston and in the bull ring, and in order to obviate any possible rotation of the piston ring within the bull ring, the piston is provided with a series of projecting lugs which enter the channels 13. Some of these lugs, as those indicated by the reference character 27, engage the ends of the sealing block 21. Others, such as lugs 28, are disposed immediately behind the bridges 19.

It will be seen that by means of the piston ring shown herein an effective sealing will be obtained with a minimum friction.

Having described the invention it will be understood that the same is not to be limited to the specific form shown herein.

We claim:

The combination of a piston having a packing ring groove, a packing ring disposed in said groove and comprising a plurality of arcuate segments, each segment having a channel formed on its inner face and also having cut-out portions on its wearing face in communication with said channel, a sealing block carried by one end of each segment, said sealing block interlocking with said channels of adjacent segments, a spring carried by said piston and exerting a pressure upon said sealing block.

In testimony whereof we have affixed our signatures to this specification.

WALTER R. G. ANDREASEN.
CLIFFORD A. TOLEMAN.